United States Patent [19]

Vander Meer et al.

[11] 4,329,576
[45] May 11, 1982

[54] DATA STORAGE MEANS AND READING SYSTEM THEREFOR

[75] Inventors: Clayton H. Vander Meer, Wyoming; Martin R. Doane, Ada, both of Mich.

[73] Assignee: Rapistan, Inc., Grand Rapids, Mich.

[21] Appl. No.: 91,598

[22] Filed: Nov. 5, 1979

[51] Int. Cl.³ .................... G06K 19/06; G06K 7/10
[52] U.S. Cl. ..................... 235/489; 235/494; 235/458
[58] Field of Search ............. 365/94; 235/458, 487, 235/489, 494

[56] References Cited

U.S. PATENT DOCUMENTS

| | | | |
|---|---|---|---|
| 2,536,155 | 1/1951 | Brand | 235/489 |
| 3,229,073 | 1/1966 | Macker et al. | 235/458 |
| 3,562,494 | 2/1971 | Schmidt | |
| 3,643,065 | 2/1972 | Dunigan | |
| 3,686,480 | 8/1972 | Bowerman | 235/487 |
| 3,751,640 | 8/1973 | Daigle et al. | 235/458 |
| 3,891,829 | 6/1975 | Dobras | 235/487 |

FOREIGN PATENT DOCUMENTS 47521 4/1974 Australia .
1810810 8/1969 Fed. Rep. of Germany .

OTHER PUBLICATIONS

Howell et al., "Self-Clocking Bar Code", *IBM Tech. Disc. Bul.*, vol. 21, No. 2, 7/78, pp. 696-697.

*Primary Examiner*—Stuart N. Hecker
*Attorney, Agent, or Firm*—Price, Heneveld, Huizenga & Cooper

[57] ABSTRACT

A data storage element includes selectively programmable rows of data locations with at least one row including a predetermined detectable pattern of indicia. When scanned by a detector the data storage element provides signals which are stored and analyzed to verify that a data storage element has been read and data reading accuracy checks performed to assure the correct reading of data information programmed on the data storage element.

21 Claims, 6 Drawing Figures

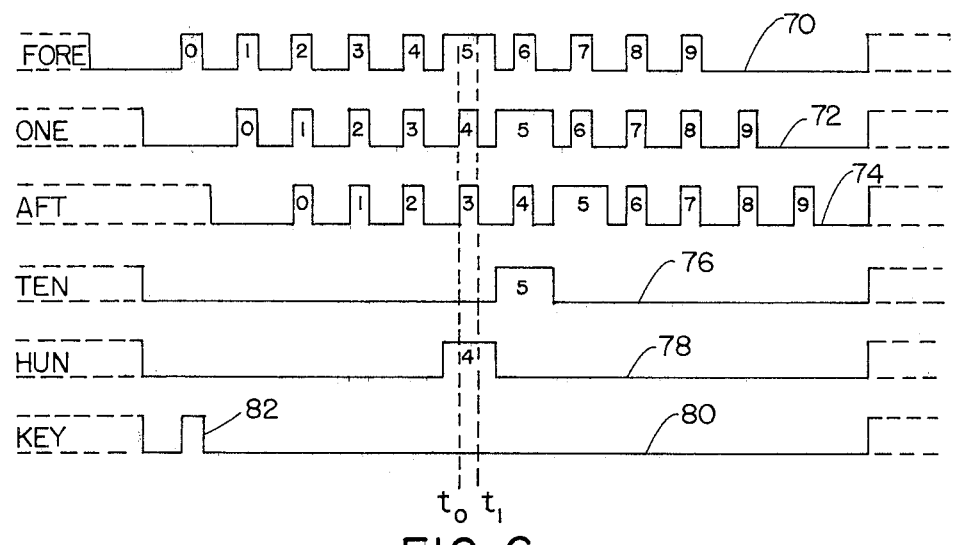
FIG. 6
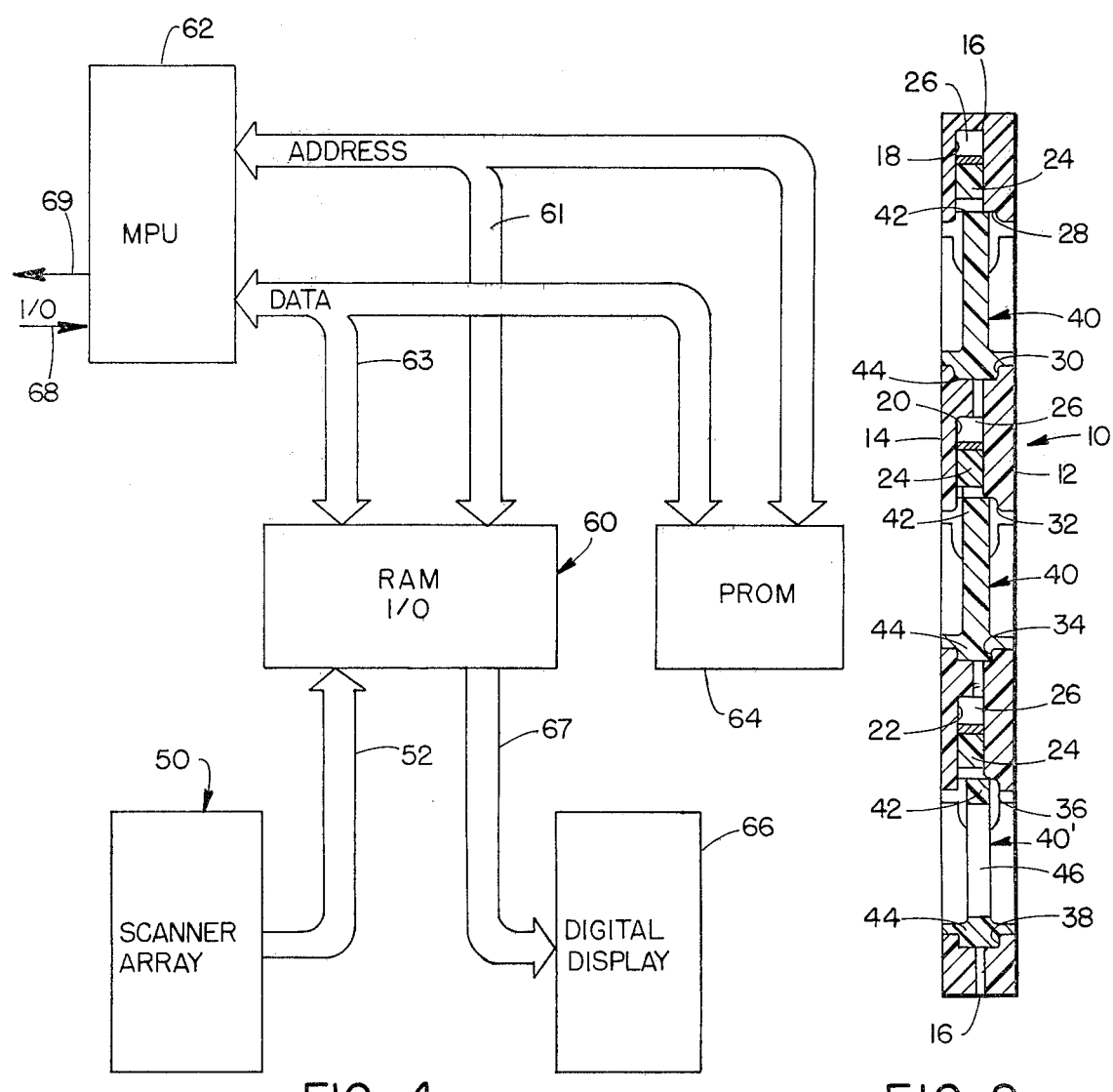
FIG. 4
FIG. 2

DATA STORAGE MEANS AND READING SYSTEM THEREFOR

BACKGROUND OF THE INVENTION

The present invention relates to data storage elements typically used in conveying apparatus for the sortation of articles and particularly to an improved data storage element and system for accurately detecting the existence of the data storage element and the data carried thereby.

In systems for the sorting and distribution of articles in a conveyor system, frequently tote pans or other article carrying devices include data storage means such as code cards which are read when the article carrier passes through a reading station. When a predetermined data code is detected, the system may divert the article at a certain discharge chute in, for example, a sorting conveyor system. Several optical, electromechanical, and magnetic code cards and reading devices are known. One problem faced by such devices is the uneven movement of a conveyor due to vibration, speed changes and other factors which can cause erroneous readings of the programmed code. U.S. Pat. No. 3,751,640 issued Aug. 7, 1973 to Daigle et al. and assigned to the present assignee discloses a code card and reading system which represents a significant improvement over existing prior art by providing a code card with selectively movable blocks positioned in rows for use with an optical reading device. Although the system disclosed therein provides accurate reading of a code, the system is designed to, in effect, look at each of the data locations of the entire card and at the same time, and thus input parallel data to the code reader. This is most economically achieved by providing, at each station, a plurality of sensors arranged in a pattern corresponding to a desired code to be read. Thus, although the system provides a greatly improved and accurate code reading arrangement it still requires that each of the sorting stations provide a unique card reading detecting arrangement and further requires a significant amount of wiring due to the utilization of a parallel code reading arrangement.

Serial code scanning systems also are known. Representative of one such system is U.S. Pat. No. 4,028,528 issued June 7, 1977 to Staes and assigned to the present assignee. In this system a single row code strip is read by at least a pair of detectors to generate clock pulses directly from the data locations of the code strip, which pulses are employed for shifting the data read into a storage device such as a shift register. Although this system provides serial scanning and therefore simplifies the data reading stations, it suggests only a two bit code which must be serially scanned and therefore requires a relatively long code carrying element. Also the clock pulses are identical to the data pulses thereby failing to provide for the analysis of detected signals possible with the present system to assure accuracy of the reading of the programmed data.

SUMMARY OF THE PRESENT INVENTION

The system of the present invention overcomes the shortcomings of the prior art by providing data storage means having at least one series of selectively programmable data location indicia and wherein at least one series of such locations includes a predetermined detectable pattern of indicia different from the data indicia for providing signals having different characteristics than the data signals when the data storage means is read. In the utilization of the data storage means a detector provides data and timing signals in response to the data and pattern of indicia which signals are stored and subsequently analyzed utilizing, in the preferred embodiment, a microprocessor for determining the existence of a data storage means and accurately detecting the data carried thereon.

In the preferred embodiment of the invention, the data storage means comprises a code card having a body with a plurality of spaced slots defining rows in which selectively movable blocking means are positioned wherein each row includes at least one empty space which can be moved by the positioning of the movable blocking elements within the row. The blocking elements of one row each include a centered opening of predetermined size different than the empty space for providing timing signals as the card is scanned by a detector.

These and other features, advantages and objects of the present invention will best be understood by reference to the following description thereof together with the accompanying drawings in which:

BRIEF DESCRIPTION OF THE DRAWINGS

FIG. 2 is a cross-sectional view of the data storage element shown in FIG. 1 taken along the section line II—II of FIG. 1;

FIG. 4 is an electrical circuit diagram in block form of the signal processing circuit employed with the code reader shown in FIG. 3;

FIG. 6 is a diagram showing the electrical signals developed from different data stored on the data storage means.

DETAILED DESCRIPTION OF THE PREFERRED EMBODIMENT

Figure 1:
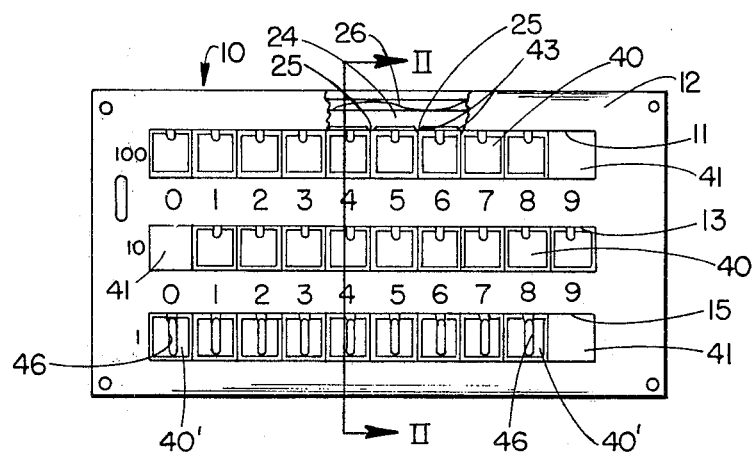
FIG. 1 is a front elevational view of a data storage element embodying the present invention.

Referring initially to FIGS. 1 and 2 there is shown data storage means which in the preferred embodiment comprises a code card 10 which is made of a body formed of a laminate of a front plate 12 and rear plate 14. Plates 12 and 14 are joined at a peripheral junction 16 with facing mating surfaces held together by a suitable adhesive. Rear plate 14 includes three horizontally extending longitudinal recesses 18, 20 and 22 (FIG. 2) for receiving therein elongated cam blocks 24 having downwardly extending horizontally spaced triangular projections 25 (FIG. 1) for, as described in greater detail below, holding blocking means 40 associated with the data card in position. Each of the cam arms 24 are spring loaded to be urged in a downward position by means of a flat leaf spring 26 extending from the upper surface of the cam arm to the upper horizontally extending surface of the L-shaped recesses 18, 20 and 22 with which the cam arms are associated.

The code card includes elongated vertically spaced parallel rectangular slots 11, 13 and 15 formed through members 12 and 14. Along the upper and lower edge of each slot are elongated generally U-shaped facing pairs of vertically spaced recesses 28, 30; 32, 34; 36 and 38 (FIG. 2) which extend horizontally along a significant portion of the length of the code card 10. The recesses 28–38 define tracks for captively and slideably holding therein blocking means comprising nine individually movable opaque blocks 40 for each of the three vertically spaced slots 11, 13 and 15. As seen in FIG. 1, each of the slots 11, 13 and 15 provide an open space 41 defining data indicia which is movable by moving blocks 40 to provide 10 different data bits (0–9). Slot 11 provides the most significant bit of data (100 digits), the middle slot 13, the middle significant digit (10 digits) and slot 15 the least significant digit (units) of a three digit number of the possible 1000 different numbers with the code card 10 of this embodiment. In the code card shown in FIG. 1, the number 909 is illustrated.

Blocks 40 are generally rectangular members with upper and lower projections 42 and 44 respectively, which extend into the respective tracks defined by recesses 28–38 for captively holding the blocks within the tracks so defined. The projections 42, as seen in FIG. 1, include tapered ends 43 permitting the triangular projections 25 to extend between adjacent blocks 40 under the compression of spring 26 for securely yet releasably holding the data blocks 40 in position.

At least one row of blocks 40 includes modified blocks 40' as compared to the blocks in the remaining two rows. The blocks 40' are modified to define a predetermined pattern of indicia which when the code card is read provides timing signals as described below. Blocks 40' each include a centrally located vertically extending elongated slot or window 46 having a width significantly less than the width of data indicia 41. In the preferred embodiment where each of the blocks 40' were generally square having a dimension of ⅜ of an inch while windows 46 had a width of approximately ⅛ of an inch and a height of ⅜ of an inch. Windows 46 thereby provide a relatively narrow detectable indicia as compared to the data windows 41. As seen in FIG. 1, windows 46 are positioned directly in vertical alignment with the center of blocks 40 of adjacent slots 11 and 13 and the data indicia windows 41. The construction of the data code card is described, with the exception of the data blocks 40' having windows 46, in detail in the above identified U.S. Pat. No. 3,751,640, the disclosure of which is incorporated herein by reference.

Figure 3:
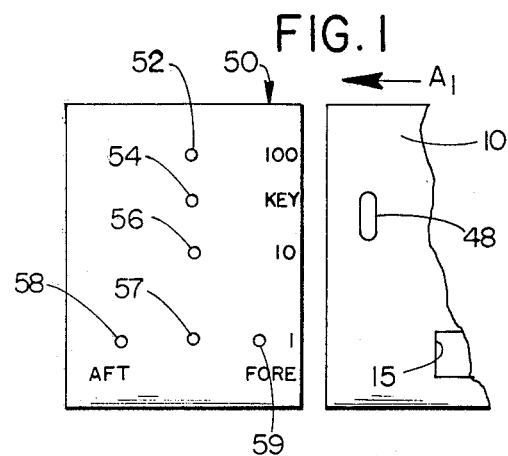
FIG. 3 is a front elevational schematic view of a reading station for reading the data on the data storage element shown in FIGS. 1 and 2.

Cards 10 can be used in connection with the sorting of a variety of products in several manners. The card can be placed on a tote tray containing articles specifically identified by the code programmed on the data card or the destination of the articles can be identified by the code. Similarly the code card can be attached to a movable conveyor or attached directly to products or other containers for products. The card also includes a key slot 48 comprising an elongated window formed through plates 12 and 14 and vertically positioned between upper slot 11 and intermediate slot 13 at the leading edge of the card. The code card is read by a suitable reading station, which in the preferred embodiment is shown in FIG. 3 and comprises a detector 50 having an array of light responsive sensors. The array includes a most significant digit reading sensor 52, a key reading sensor 54, a middle significant digit reading sensor 56, a least significant reading sensor 57, all of which are vertically aligned in a column and spaced at the same distance as rows 11, 13 and 15. The key reading sensor 54 is positioned to align with the key 48 as the code card moves past the detector 50 in a direction indicated by arrow A in FIG. 3. The array of sensors also includes a fore sensor 58 and an aft sensor 59 horizontally aligned with sensor 57 and spaced therefrom a distance corresponding to the center-to-center distance between adjacent data blocks 40'. Thus, sensors 57, 58 and 59 span three data indicia locations in their sensing fields and are positioned to provide signals representing a repetitive scan of the data and timing indicia of slot 15.

In the embodiment described, code card 10 is illuminated at the reading stations from one side by a suitable light source directing light toward, for example, the front plate 12. Detector 50 is placed in alignment with the code card on the opposite facing side 14 such that the sensors will detect light passing through any of the data windows 41, key 48, or the timing windows 46 contained by one of the rows of blocks.

Figure 5:
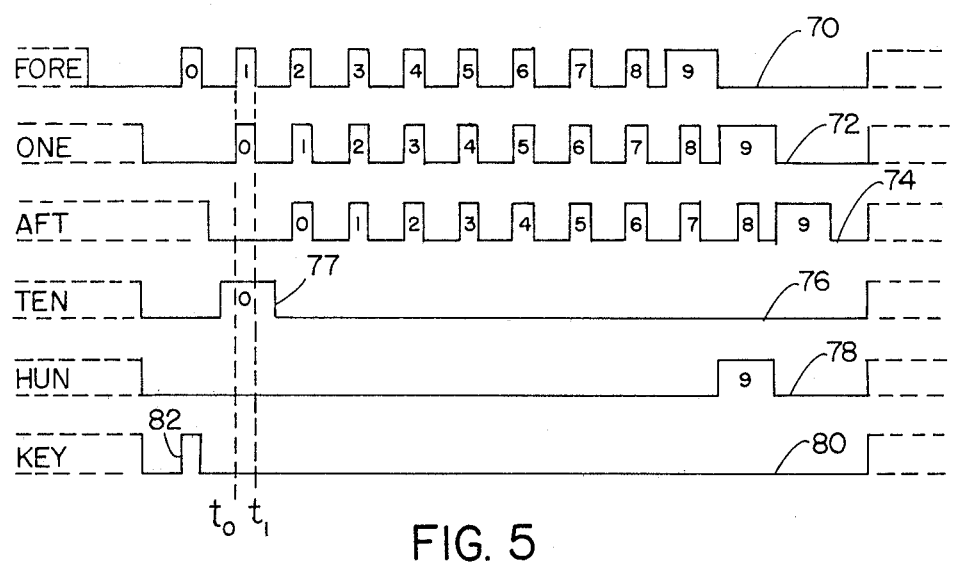
FIG. 5 is a diagram showing the electrical signals developed by the reader in response to the detection of the data storage means shown in FIGS. 1 and 2 and which are processed by the circuitry shown in FIG. 4.

Card 10, shown in FIGS. 1 and 2, if passed through the reader as shown in FIG. 3, will provide a signal output pattern as shown in FIG. 5 for the data corresponding to number 909. If the data blocks 40 and 40' were moved to provide the number 455, the digital output signals from the sensors would provide a pulse pattern as shown in FIG. 6. The data card naturally moves serially by the array of sensors at speeds upwards to 600 feet per minute in some conveyor systems and the electrical output signals shown in FIGS. 5 and 6 represent the logic state of the signals from the sensors which are stored, processed and analyzed by the electrical circuit shown in block diagram form in FIG. 4.

In FIG. 4, the detector 50 is electrically coupled to a microprocessor 62 through input/output circuits 60 including a random access memory (RAM). The sensor array 50 is coupled to circuit 60 by means of intercoupling 52 while address information is transmitted between circuits 62 and 60 by coupling 61. Coupling 63 interconnects these circuits for the transmission of data information therebetween. The microprocessing unit 62 is also coupled to a programmable read only memory (PROM) 64 by the electrical connections 61 and 63. PROM 64 stores the programming instructions for controlling the handling of data by circuits 60 and 62 as described below. In the preferred embodiment, the microprocessing unit 62 was an Intel 8085 integrated circuit chip, RAM 60 was an Intel 8155 chip, and PROM 64 was a pair of Intel 2758 chips. A digital display 66 provides a digital readout of the number provided by the code card 10 and comprises a three digital LED display coupled to the microprocessor through I/O circuit 60 and interconnections 67. The microprocessing unit 62 includes an input line 68 permitting the input of divert codes, for example, to control the diverting of articles once a code card has been identified and associated with a particular divert location as well as an output line 69 for providing serial data code signals out, or output divert signals to actuate a conveyor line divertor. Naturally these inputs and outputs associated with the microprocessor can be used for other functions as well.

The detected data and timing signals shown, for example, in FIG. 5 are temporarily stored in RAM memory 60 and processed in a unique manner to assure the accurate reading of the data contained on the code card 10 by correlation of timing information from the various sensors with each other and the data pulses as now described. In connection with such operation, the program for PROM 64 to achieve the desired data handling and correlation is disclosed in the program listing identified as Appendix A and incorporated herein by reference and attachment as part of the specification.

In FIG. 5, the upper row of signals 70, when in the logic high state, correspond to light detected by the FORE sensor 59, the second line of signals 72 corresponds to light detected by the unit detector 57 while the third line of signals 74 corresponds to light detected by AFT sensor 58. The fourth line of signals 76 represent light detected by the tens sensor 56 while the fifth line of signals 78 correspond to light detected by the 100th's detector 52. The bottommost row of signals 80 correspond to light detected by the key sensor 54. Each of the signals represents a logic level 0 for the detection of no light with the card system shown in FIG. 3 while the logic "1" or upper level of the signals corresponds to the detection of light by the transmission of light through one of the data windows 41 or timing signal windows 46. Naturally the quiescent state of the detectors is to provide a steady state logic "1" output since the light source at the reading station will illuminate the detectors on a continuous basis. Thus, the microprocessor tests for and responds to transition signals where light interruption occurs.

Inasmuch as the bottommost row 15 of data blocks 40' of code cards 10 each include a timing pulse window 46 and one data window, it will be appreciated that for code of the FORE, one, and AFT signals 70, 72 and 74; a train of ten pulses should be detected when a card 10 travels through reader 50. Thus, the microprocessor checks the data stored for the signals detected by sensors 57, 58 and 59 initially to ascertain whether or not ten bits of information have been read by each sensor. If the number of bits is less than or greater than ten, it is assumed that there is either a misread of the card or that the light interruption was due to some cause other than the passage of the code card through the reader. This causes an output error signal to be displayed by the digital display 66 and if the system is associated with a sorting conveyor, the product with which the code card is associated is not diverted but instead transported to a stub conveyor or the like for subsequent reprocessing.

After the initial confirmation of the existence of a card by the above bit or pulse counting of each of the signals 70, 72 and 74, a comparison is made of adjacent timing pulses on waveform 70 and 72 and subsequently 72 and 74. Thus, for a code card to have traveled through a reader, bit number 1, shown on waveform diagram 70, will be in alignment with bit 0 shown on waveform 72. Similarly, bit 2 wil align with bit 1 of waveform diagram 70 and 72 respectively as will the remaining bits through bits 9 and 8 respectively. In like manner, bit number 1 in waveform diagram 72 will align with bit 0 of waveform diagram 74 and so forth through bits 9 and 8 respectively. The pulse widths are compared during this step to ascertain where the least significant data bit is located. If a data pulse is discovered by comparing the width of the pulses in the embodiment shown, this occurs at bit number 9 for signal 72. This data bit is detected twice by separate comparisons of signals 70 and 72, and then signals 72 and 74. If no wide pulses (i.e. data signals) are discovered or if more than one wide pulse is discovered, an error signal is generated indicating that the card is misread. Thus, the system provides a double check to ascertain the existence of a single data pulse on the row of data corresponding to the timing data block row. In addition, the same double comparison is made between signals 70 and 76, and 74 and 76 and again between signals 70 and 78, and 74 and 78. The detection of the data pulses is achieved by detecting whether or not the data pulse is at a logic high level at the leading and trailing edge of an aligned timing pulse. Thus, as shown in FIG. 5, at time $t_0$ corresponding to the leading edge of the first data pulse interval and that of the first timing pulse, the digit 0 at the ten digit location at the center row should be at a logic level "1", as it is. Similarly at time $t_1$ corresponding to the trailing edge of timing pulse 1 the data pulse 77 on line 76 should still be at a logic high level. If it is at both sample times $t_0$ and $t_1$, the data is verified as being accurate. If not, again an error signal is generated.

As can be seen, the system is speed independent since both the timing pulses and data pulses will vary in width the same amount as a function of the speed of the code card through the system. Such variable pulse widths do not affect the reading of the data since the relative widths of the timing and data pulses remain the same with the timing pulses being approximately ⅓ the duration of the data pulses. The key pulse 82 shown on waveform 80, is employed only to initiate the storage of the signals scanned by the data detecting photocells 52, 56 and 57-59.

The time period $t_0$ to $t_1$ corresponding to a timing pulse interval is in effect, therefor, a sample period for the significantly wider data pulses and will provide, due to the physical spacing of the blocks 40 and 40', and windows 41 and 46, an accurate means by which the verification of a code card can initially be made and the data accurately read therefrom. For purposes of illustration, in FIG. 6 the data and timing signals read are for a code of 455 programmed on the code card 10 by providing a window at location 4 in the 100's top row 11, a window at location 5 on the middle row 13 and a data window at location 5 in the lowermost row 15 as viewed in FIG. 1. The resultant signals are shown in FIG. 6 where it is seen that the timing pulses occur in identical location as compared with FIG. 5 but the data pulses shift with respect thereto but are aligned with timing pulses such that accurate data verification can be made. Thus, with applicant's system, a code card is serially scanned by an array of photo detectors and the pulse width information detected therefrom stored in the microprocessor RAM memory and subsequently the above described comparison steps and tests made on the stored data to accurately verify first, the existence of a code card and secondly, the verification of valid data contained on the code card.

It will become apparent to those skilled in the art that various modifications to the preferred embodiment of the invention described herein can be made. Thus, for example, instead of a light transmissive code card, the cards can be made with the data and timing information being in the form of reflective signals for photocell detection. Entirely different data storage and sensing means also could be employed. Thus, for example, magnetic code strips painted on objects or mechanical encoding could be employed to provide the timing and data signals. With such systems, the speed of the data storage means with respect to a reader can be varied without affecting the accuracy of the data detection. These and other modifications to the preferred embodiment of the invention will become apparent to those skilled in the art and will fall within the spirit and scope of the invention as defined by the appended claims.

The embodiments of the invention in which an exclusive property or privilege is claimed are defined as follows.

1. Code carrying means for attachment to articles including at least one selectively reprogrammable series of data indicia locations and wherein said at least one series includes a predetermined pattern of indicia aligned in predetermined relationship with respect to said data indicia locations and different than that of said data indicia locations for providing signals used for data reading accuracy checks.

2. The apparatus as defined in claim 1 wherein said data indicia and said predetermined pattern of indicia comprises detectable elements of different dimension.

3. The apparatus as defined in claim 2 wherein said detectable elements are optically detectable.

4. The apparatus as defined in claim 3 wherein said code carrying means comprises a body and said data indicia locations comprises a slot formed in said body for receiving movable block means for selectively obstructing portions of said slot to define a data element.

5. The apparatus as defined in claim 4 wherein said block means includes said pattern of indicia therein.

6. The apparatus as defined in claim 5 wherein said block means comprises a plurality of separate blocks slideably positioned within said slot and wherein said pattern of indicia comprises aperture means formed in a plurality of said blocks.

7. The apparatus as defined in claim 6 wherein said plurality of blocks leave a movable space in said slot defining said data element and wherein said aperture means comprises a window formed through each of said blocks and having a width significantly less than the width of said space.

8. The apparatus as defined in claim 7 wherein said body includes at least an additional slot spaced from said first named slot and including a plurality of blocks slideably positioned within said additional slot to define an additional data element, said blocks of said additional slot being alignable with said blocks of said first named slot.

9. The apparatus as defined in claim 8 wherein said windows are formed through the center of said blocks.

10. A data carrying element for use in identifying objects by scanning such element with detector means, said element comprising:
  a first series of data locations which can be selectively reprogrammed to provide readable data signals therefrom;
  a second series of data locations which can be selectively reprogrammed to provide readable data signals therefrom, wherein the improvement comprises one of said first or second series of data locations including a plurality of detectable indicia aligned in predetermined relationship with respect to said data locations for providing timing signals different than said data signals and having a predetermined relationship to said data signals when said data carrying element is scanned.

11. The apparatus as defined in claim 10 wherein said first and second series of data locations are aligned such that timing signals from said detectable indicia occur during a data signal when said data carrying element is scanned.

12. The apparatus as defined in claim 11 wherein said detectable indicia has a dimension different than that of said data locations.

13. The apparatus as defined in claim 12 wherein said data locations and said detectable indicia are optically detectable.

14. The apparatus as defined in claim 13 wherein said data carrying element comprises a body and wherein said first and second series of data locations comprises a pair of spaced elongated members positioned on said body and each including movable blocking means therein each alignable with the corresponding blocking means of the other elongated member.

15. The apparatus as defined in claim 14 wherein said blocking means of one of said elongated members include windows formed therein to define said detectable indicia.

16. The apparatus as defined in claim 15 wherein said windows are centrally positioned within said blocking means.

17. The apparatus as defined in claim 16 wherein said spaced elongated members comprises slots formed in said body and wherein said blocking means comprises a plurality of blocks slideably positioned in said slots.

18. The apparatus as defined in claim 17 wherein said blocking means are movable to leave a movable opening within said slots and said windows have a width less than one-fourth the width of said movable opening.

19. A code card comprising:
  body means having at least a pair of spaced elongated slots extending therealong;
  a plurality of block means movable along each of said slots wherein said block means in each slot is less than the length of said slot to define an opening through said body such that movement of said block means in a slot permits the position of said opening to change, and wherein a plurality of blocks in at least one of said slots each include an aperture extending therethrough having a dimension significantly smaller than the width of one of said blocks.

20. The apparatus as defined in claim 19 wherein said aperture in each of a plurality of blocks is elongated in a direction orthogonal to the direction of reading of the code card and is centered in the block in which it is formed.

21. Data storage means associated with an object and means for detectng data contained thereon comprising:
  data storage means providing a plurality of rows of available data locations which can be selectively reprogrammed to provide selected information thereon, wherein at least one row of data locations includes a predetermined detectable pattern of indicia aligned in predetermined relationship with respect to said data locations;
  detecting means for reading said data storage means to provide electrical data output signals in response to programmed data information and timing signals in response to said pattern of indicia contained on said data storage means, and
  circuit means coupled to said detecting means for storing data and timing signals and for analyzing the stored signals to ascertain if a data storage means has been read and to provide output signals representing the data on said storage means if read.

* * * * *